United States Patent [19]

Feess et al.

[11] 4,118,186
[45] Oct. 3, 1978

[54] PROCESS FOR THE FIXATION OF ORGANIC DYESTUFFS ON MATERIALS HAVING A FIBROUS STRUCTURE

[75] Inventors: Erich Feess, Hofheim am Taunus; Hartmut Springer, Konigstein, Taunus; Willy Gronen, Kelkheim, all of Fed. Rep. of Germany

[73] Assignee: Hoechst Aktiengesellschaft, Frankfurt am Main, Fed. Rep. of Germany

[21] Appl. No.: 796,039

[22] Filed: May 11, 1977

[30] Foreign Application Priority Data

May 13, 1976 [DE] Fed. Rep. of Germany ....... 2621274

[51] Int. Cl.$^2$ ................. C09B 27/00; C07D 249/00; D06M 13/38
[52] U.S. Cl. ............................. 8/49; 8/1 D; 8/1 XA; 8/21 C; 8/25; 8/46; 8/54.2; 260/308 B
[58] Field of Search .................. 8/1 D, 1 XA, 46, 49, 8/25; 260/308 B

[56] References Cited

U.S. PATENT DOCUMENTS 3,639,431   2/1972   McTeer et al. ................. 260/308 B

FOREIGN PATENT DOCUMENTS 895,029   4/1962   United Kingdom.
899,899   6/1962   United Kingdom.
1,060,233   3/1967   United Kingdom.
1,112,875   5/1968   United Kingdom.

OTHER PUBLICATIONS

Booth, G., "Phthalocyanines" in Venkataraman's "The Chemistry of Synthetic Dyes", vol. V, (Academic Press, 1971), p. 263.
Krasovitskii et al., Chem. Abs., 1953, 47, 12319f.
Benson, F. R., et al., Chemical Reviews, 1956, 46, p. 41.

Primary Examiner—A. Lionel Clingman
Attorney, Agent, or Firm—Curtis, Morris & Safford

[57] ABSTRACT

A process for the fixation of organic dyestuffs on materials having a fibrous structure had been found, in which an organic dyestuff containing one or several groups of the formula (I)

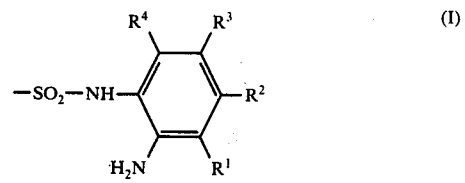

wherein $R^1$, $R^2$, $R^3$ and $R^4$ each represent a non-ionic, anionic or cationic substituent, with the exception of a primary or secondary amino group or the salts thereof, is applied in dissolved form onto said materials and subsequently subjected to the action of nitrous acid. The process yields fiber materials on which active substances, such as dyestuffs, brighteners, mothproofing agents, water-repellent agents, etc., are fixed fast; the novel process is especially and advantageously suitable in combination with the ice-color technique.

5 Claims, No Drawings

PROCESS FOR THE FIXATION OF ORGANIC DYESTUFFS ON MATERIALS HAVING A FIBROUS STRUCTURE

A novel process for fixing an organic compound on a material having a fibrous structure has been found, which comprises applying, in dissolved form, an organic compound containing one or more, preferably two to four groups of the formula (I)

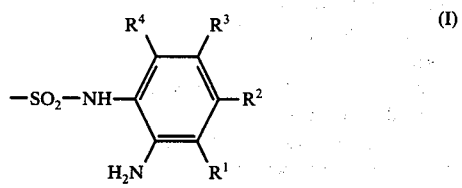

onto these materials and subjecting the applied compound to the action of nitrous acid.

The phrase "in dissolved form" means that the dyestuff is applied in solution in an aqueous, aqueous-organic or organic solvent or medium suitable for the application process.

Said compounds have as a common, inventive structural feature the ortho-amino-anilide radical.

In the formula (I), $R^1$, $R^2$, $R^3$ and $R^4$ are non-ionic, anionic or cationic substituents, with the exception of a primary or secondary amino group or the salts thereof.

More specifically, in formula (I) $R^1$, $R^2$, $R^3$ and $R^4$ are the same or different and each is a hydrogen atom, a halogen atom, such as chlorine or bromine, a lower alkyl group unsubstituted or substituted, for example by hydroxy, chlorine, carboxy, sulfo, sulfato, or is an aryl radical, such as phenyl, or a lower alkoxy group which may be substituted in the alkyl radical, for example, by lower alkoxy, or is an aryloxy group, such as phenoxy, a carboxy, a carbonamide group or a carbonamide group which is mono- or di-substituted by lower alkyl, or is an arylcarbonamide group, such as phenylcarbonamide, or a cyano or carbalkoxy group of 2 to 5 carbon atoms, an alkanoyl group of 2 to 5 carbon atoms, such as acetyl or propionyl, or an alkanoyloxy group of 2 to 5 carbon atoms, a lower alkenylsulfonyl group, a lower alkylsulfonyl group which may be substituted in the alkyl radical, for example by chlorine, hydroxy, lower dialkylamino, sulfo, sulfato, phosphato, carboxy groups, or is an arylsulfonyl group, such as phenylsulfonyl, a sulfo, sulfonamide, N-(lower alkyl)-sulfonamide group which may be substituted in the alkyl radical, for example by chlorine, hydroxy, lower dialkylamino, sulfo, sulfato, phosphato, carboxy groups, or is a N,N-di-(lower alkyl)-sulfonamide group, the two groups or preferably one of them optionally being substituted in the alkyl radical, for example by chlorine, hydroxy, lower dialkylamino, sulfo, sulfato, phosphato, carboxy, or is a trifluoromethyl or nitro group, a lower alkylsulfonylamino group which may be substituted in the alkyl radical, for example by chlorine, hydroxy, lower dialkylamino, sulfo, sulfato, phosphato, carboxy, or is a N-(lower alkyl)-alkylsulfonylamino group, whose lower alkyl radical which is present at the sulfonyl group may be substituted, for example by chlorine, hydroxy, lower dialkylamino, sulfo, sulfato, phosphato, carboxy, or is an alkanoylamino or alkenoylamino group having from 2 to 5 carbon atoms each, a benzoylamino group which may be substituted by 1 or 2 substituents selected from the group chlorine, lower alkyl, lower alkoxy, sulfo, sulfonamide, N-lower alkyl, sulfonamide, N,N-di-lower alkyl-sulfonamide and carboxy, or is an arylsulfonylamino group, such as phenylsulfonylamino, or $R^2$ and $R^3$ together form the group —NH—CO—NH—, with the proviso that at least one, preferably two, especially three or four of the radicals $R^1$, $R^2$, $R^3$ and $R^4$ stand for a hydrogen atom each, and $n$ is a number of from 1 to 4.

The term "lower" in the above as well as in the following passages means that the alkyl or alkenyl or alkylene radical contained in the groups consists of from 1 to 4 carbon atoms.

If the novel compounds contain anionic groups, they are present preferably in the form of their alkali metal salts, such as the sodium or potassium salts, or of alkaline earth metal salts, such as calcium salts, or in the form of ammonium salts.

Use is preferably made of organic compounds with the group of the formula I, in which the substituents $R^1$, $R^2$, $R^3$ and $R^4$ are identical or different and each is a hydrogen atom, a chlorine atom, a methyl, ethyl, methoxy, ethoxy, acetylamino, propionylamino, cyano, carboxy, carbethoxy, carbomethoxy, carbonamide, N-methyl- or N-ethylcarbonamide group, a N-phenyl-carbonamide group, a sulfonamide, N-methyl- or N-ethyl- or N,N-dimethyl- or N,N-diethyl- or N-methyl-N-phenyl-sulfonamide group, a methylsulfonyl, ethylsulfonyl, phenylsulfonyl, acetyl, propionyl, benzoyl, phenyl β-hydroxy-ethylsulfonyl, β-chloroethylsulfonyl, β-sulfato-ethylsulfonyl, β-sulfoethylsulfonyl group, a vinylsulfonyl group, a sulfonamide group mono- or disubstituted at the nitrogen atom by a β-hydroxyethyl or β-sulfato-ethyl or β-sulfoethyl group, or is an acetyloxy, propionyloxy, benzoyloxy, phenoxy, trifluoromethyl, nitro, benzoylamino, methylsulfonylamino, ethylsulfonylamino, phenylsulfonylamino group or a phenylsulfonylamino group substituted in the nucleus by substituents selected from lower alkyl, lower alkoxy and chlorine, with the proviso that preferably 2, especially 3 or 4 of the radicals $R^1$, $R^2$, $R^3$ and $R^4$ represent a hydrogen atom each.

Of special interest are those compounds wherein in the group of the formula I one of the radicals $R^1$, $R^2$, $R^3$ and $R^4$ represents a cyano, carboxy or carbonamide group and the other three radicals stand for hydrogen, or wherein each of the four radicals $R^1$, $R^2$, $R^3$ and $R^4$ represents a hydrogen atom, and $n$ is a number of from 2 to 4.

Preference is given particularly to an embodiment of the process of the invention using as a dyestuff a compound of the formula

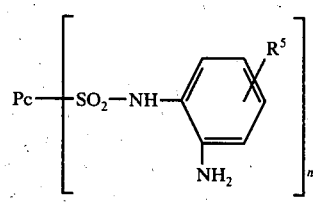

in which Pc stands for the copper, nickel or cobalt phthalocyanine residue, preferably the copper phthalocyanine residue, $R^5$ is hydrogen or the cyano group, $n$ stands for a number of from 2 to 4, and in which the radicals of the formula

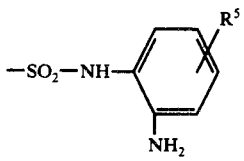

are bound in the 3- or 4- or 3- and 4-positions, preferably in the 3-positions of the aromatic carbocyclic rings of the phthalocyanine skeleton.

Of all the above-mentioned compounds having the formula (I), preference is given especially to those which do not contain any anionic groups.

Due to the special constitution of the group of the formula I, compounds containing this group are soluble in alkalis and in acids, so that they may be applied from an alkaline as well as from an acid solution, but also from a neutral solution, if they contain an acid group, such as a sulfo group. In all cases the solubility can be improved by optionally adding appropriate substances, such as urea, caprolactam, thiodiethyleneglycol, N-methylpyrrolidone, dimethylformamide, dimethylsulfoxide, diethylene-glycol-mono-n-butylether or other organic solvents or solubilizers. However, it is not at all necessary to use aqueous alkalis or acids, but there may be applied solely organic solvents, such as the above-mentioned compounds.

Through the fixation of the compounds containing the group of the formula I by treating them with nitrous acid there is formed from the radical of the formula I via diazotation and cyclization, a 1-sulfonyl-benztriazole radical of the formula II

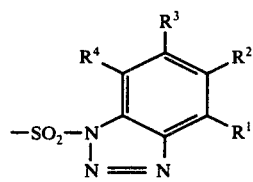

in which $R^1$, $R^2$, $R^3$ and $R^4$ are defined as above. The compounds thus formed having the radical of the formula II are far less soluble in an aqueous medium than the starting compounds which contain groups of the formula I and are therefore fast-fixed on or in the substrate.

Other processes for fixation of organic compounds on materials having a fibrous structure have already been known which are based on the principle of converting soluble compounds into insoluble or sparingly soluble compounds; some of them are also used in industry. All these processes are based on the common feature that water-soluble compounds are applied in a dissolved form onto the substrate or incorporated into the substrate and are then converted by a suitable modification into an insoluble form, so that they adhere strongly to or in the substrate. The necessary modification may, for example, consist in splitting off solubilizing groups. As is known, a process of this kind has become important in industry in the case of the sulfuric acid esters of the leuco vat dyes which, after being adsorbed by the fiber, are saponified by the action of an acid and are oxidized by an oxidizing agent to give the basic vat dye.

Another possibility consists in fixing the compound applied onto the substrate by a molecule enlargement. This principle is applied in industry, for example, in the case of the developing dyes, where a coupling component adsorbed by the fiber is reacted by a subsequent coupling with a diazo compound to give a sparingly soluble azo dyestuff.

However, many of the fixation processes applied in industry have the drawback that they can only be used for a determined type of compound. Thus, for example, vat dyes can only be obtained from compounds having vatting systems, and azo developing dyes are formed only from the known selection of diazo and coupling components, so that the two processes are limited with regard to the color shades which can be obtained by these compounds.

The objective therefore was to develop a process to be used in industry, which can be applied universally and may be combined with, or used in, application processes which are known in technology.

A process of this kind has been found through the present invention.

Another remarkable difference and advantage of the process of the invention as compared with processes which have been known so far is to be seen in its considerably extended field of application due to the fact that the organic compounds containing the group of the formula I which are used according to the invention can be obtained easily and universally.

The present process is excellently suitable, for example, to dye fibrous material in fast color shades by using dyestuffs having a group of the formula I or to impart to fibrous material — while using other corresponding active substances containing the group of the formula I — mothproof properties, water-repellent characteristics, a soft feel, an increased tinctorial power, an excellent optical brightening, non-creasing properties, a flameproof finish, and other properties.

The process of the invention may therefore serve to finish fibrous materials of all types, for example, natural or synthetic textile fibers, such as wool, silk, synthetic protein-based fibers, polyamide fibers, for example, polyamide-6, polyamide-66, polyamide-11, cellulose fibers, such as cotton, hemp, linen, regenerated or acetylated cellulose, polyester fibers, for example those of terephthalic acid and hexane-diol, polyacrylonitrile fibers or polyethylene or polypropylene fibers. There may also be used in particular mixtures of two or several of these types of fiber together. The fibrous material can be used as loose fiber material, in the form of a yarn, flock, fleece, as knitted fabric or as woven fabric. Furthermore, the process of the invention also serves to treat leather, sheets and other materials of a fibrous structure, such as paper, cardboard, imitation leather and the like.

The compounds having the group of the formula I which are suitable for application may be present in the form of their acid salts of the amino group in ortho-position to the sulfonamide group, for example, in the form of the hydrochlorides, sulfates or hydrogenosulfates, or also in the form of the alkali metal salts, such as the sodium or potassium salts, alkaline earth metal salts, such as calcium salts, or in the form of the ammonium salts. The hydrogen atom of the sulfonamide group of the group of formula I reacts acidic so that it is capable to form salts with alkalis.

In order to produce dyeings and prints or generally to fix the compounds having a group of the formula I on the fiber, the said compounds are applied in common manner as has been known for other application processes, for example, dyeing and printing processes, from an aqueous or aqueous-organic medium onto the fibrous material and are subsequently exposed on the fiber to the action of nitrous acid. The application of the compounds containing the group of the formula I onto the various fibrous materials may be effected from an aqueous-alkaline, an aqueous-neutral or aqueous-acid solution; the aqueous solutions may also contain an organic solvent which is miscible with water, for example, methanol, ethanol, N-methyl-pyrrolidone. In accordance with the common application methods it is also possible to add the usual auxiliary agents and manufacturing agents to the solutions containing the compound with the group of the formula I. The fibrous materials treated with these solutions or printing pastes containing a compound with the group of formula I either in a bath having a temperature of from 10° to 80° C. or preferably by padding or printing (at 10° to 40° C.), are subsequently subjected, optionally following a drying process at a temperature in the range of from 30° to 80° C., to the action of nitrous acid.

The action of nitrous acid is preferably effected by setting free nitrous acid from an alkali metal nitrite which is contained in a dissolved state in a bath, in the padding liquor or printing paste, by means of an inorganic or organic strong or moderately strong acid, preferably hydrochloric acid, sulfuric acid, phosphoric acid, formic acid, acetic acid, or a lower aliphatic acid which contains one or several, such as 1, 2 or 3, halogen atoms, preferably chlorine atoms, or hydroxy groups.

The process of the invention may be carried out, for example, by treating the fibrous material pretreated (pre-dyed) with a compound containing the group of the formula I in an aqueous bath of an alkali metal nitrite, such as sodium nitrite, at a temperature of from 10° to 30° C., or by padding it over with an aqueous solution of this alkali metal nitrite at a temperature of from, for example, 10° to 30° C., or by applying this solution by way of spraying, then optionally drying the material and treating it in an aqueous bath of a strong or moderately strong acid, such as hydrochloric acid, formic acid, chloroacetic or sulfuric acid, preferably formic, monochloroacetic or hydrochloric acid, the bath having a normality of from about 0.5 N to 3 N of this acid, at a temperature of from 0° to 30° C. or by padding the material over with an acid solution of this kind or by applying the same by spraying, or by treating the "dyeings" thus treated which contain alkali metal nitrite, with a vapor of hydrochloric, formic or chloroacetic acid at a temperature of from 20° to 80° C. Another way to carry out the process of the invention is to pretreat the fibrous material beforehand with alkaline solutions or printing pastes of the compounds having the group of the formula I, to which an alkali metal nitrite, such as sodium nitrite, was added, and the fibrous material thus treated are subjected, optionally after a drying process, to an acid treatment, for example in an acid bath or by padding over or spraying with an acid solution, for example an aqueous 0.5 N to 3 N hydrochloric, chloroacetic or sulfuric acid solution, or are treated with the vapors of hydrochloric, formic or chloroacetic acid according to the method described above. It is also possible to carry out a hot-air treatment with air of a temperature in the range of from 60° to 200° C. or a treatment with optionally superheated steam having a temperature of from 102° to 180° C. after the application of the acid.

Under the action of nitrous acid on the compounds having the group of the formula I, the latter lose their solubility partially or entirely and are thus fast-fixed on or in the fibrous material. Thus, by means of the compounds which contain the group of the formula I materials are obtained according to the process of the instant invention which contain an active substance, for example, dyeings or textile materials having a mothproof finish, which are distinguished by a good fastness to washing, to water, to rubbing, to perspiration, to chlorine as well as to light.

The process of the invention is used preferably in order to fix dyestuffs on textile materials. Dyestuffs which are appropriate for this purpose and which contain the group of the formula I belong to various classes of dyestuffs, for example, triarylmethane, azine, dioxazine, phenazine, phenoxazine, nitro, stilbene, vat dyes or mono- and polyazo dyestuffs, especially phthalocyanine dyestuffs, which contain the group of the formula I.

Since the reaction conditions for the cyclization with nitrous acid or sodium nitrite and acid correspond to the diazotization conditions of the dyestuff bases for producing the so-called developing dyes in accordance with the well-known ice color technique (cf. for example, Naphtol As - Anwendungsvorschriften of Farbwerke Hoechst AG), the two classes of dyestuff may be used together in the dye bath or in the printing paste; thus, the process of the instant invention may be applied above all for the preparation of brilliant green color shades which have been lacking so far in the assortment of the developing dyes.

The combination of the process of the invention with the known process for preparing developing dyes on the fiber represents a valuable supplementation of the present dyeing processes. A particularly advantageous method is represented by a process variant, according to which a printing paste which contains the diazotizable aromatic amine of the ice color technique or the diazonium salt or a stable derivative thereof, for example a triazene compound, the coupling component of the ice color technique, an appropriate dyestuff having the group of the formula I as well as sodium nitrite, is applied onto the fibrous material, preferably a cellulose fiber material, and is subsequently developed under the action of an acid according to the ice color technique or according to one of the above-described process variants. As acids there are preferably suitable lower aliphatic acids, such as $(C_1-C_4)$-alkanecarboxylic acids, especially those containing one or several hydroxy groups or halogen atoms, such as chlorine atoms. As the diazotization and coupling generally require different pH values, use is preferably made of formic acid; the use of formic acid has the advantage that after the diazotization, if the subsequent coupling is initiated in a steaming process, the pH value rises by itself due to an evaporation of the formic acid, furthermore that excess formic acid is oxidized by nitrous acid being set free, which at the same time contributes to eliminate undesired nitrous gases.

The process according to the invention may also be combined with fiber-reactive dyestuffs which do not contain a primary or secondary amino group which would be diazotized or nitrosated. Thus, for example, the reactive dyestuff may be added to the alkaline padding liquor or printing paste or to the alkaline dye bath containing the compound with the group of the formula I; the reactive dyestuff is fixed during the treatment in the alkaline dye bath or while drying the padded or printed fabric subsequently; then, the compound which contains the group of the formula I is fixed by an acid treatment according to the process of the instant invention. In this manner, further possibilities of varying the color shades are available.

The compounds of the process of the invention which contain the group of the formula I once or several times, may be prepared, for example, by reacting a corresponding compound — which already shows the property of an active substance, or the primary product thereof containing one or several sulfochloride groups — with an optionally substituted 1,2-diaminobenzene in a manner which is common for a person skilled in the art. This reaction may be carried out in an aqueous medium, the addition of an organic solvent miscible with water optionally being advantageous, or in an anhydrous organic solvent, for example, methanol, N-methyl-pyrrolidone or dimethylformamide. In all cases, an addition of acid-binding agents, such as sodium acetate, sodium or potassium bicarbonate, sodium or potassium carbonate, pyridine or other tertiary organic bases is advantageous, however, there may also be used an excess amount of 1,2-diaminobenzene which binds the hydrochloric acid being formed. An excess of 1,2-diaminobenzene is recommended in any case, if a complete reaction of all present sulfochloride groups with 1,2-diaminobenzene is to be achieved.

The introduction of the sulfochloride groups into the molecule is suitably effected, for example, by reacting the active substance (for example, a dyestuff chromophore, a mothproofing compound or other substances) or a precursor thereof with chlorosulfonic acid and optionally thereafter with thionyl chloride in a manner which is known and has been described in literature, or in an analogous manner common for a chemist.

However, it is also possible to prepare the compounds with the group of the formula I, for example, by reacting an appropriate sulfochloride with a primary aromatic amine which contains in the o-position to the amino group an acylamino or a nitro group, in the manner common for a person skilled in the art, and by deacylating and/or reducing the intermediate compound formed by way of known analogous methods.

The following Examples serve to illustrate the invention. The parts are parts by weight, and the percentages are percent by weight, unless stated otherwise. Parts by volume are to parts by weight as is the liter to the kilogram. The formula radicals CuPc, NiPc and CoPc in the Examples represent the unsubstituted copper, nickel or cobalt phthalocyanine skeleton.

EXAMPLE 1

10 Parts of a dyestuff corresponding to the following constitution

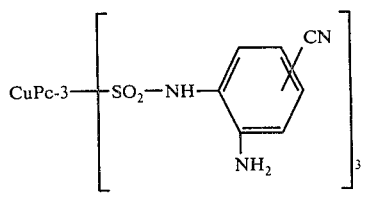

are mixed with 100 parts of urea and dissolved by adding a solution of 40° C. of 200 parts by volume of water and 20 parts by volume of an aqueous 32.5% sodium hydroxide solution. The solution obtained is introduced into 500 parts of a printing thickener consisting of 400 parts of a 6% aqueous bean flour ether which is fast to alkali, 95 parts by volume of water and 5 parts by volume of an aqueous 32.5% sodium hydroxide solution; subsequently 20 parts of an aqueous 33% sodium nitrite solution are added, and the mixture is made up to a total of 1,000 parts with water or with the thickener from bean flour ether fast to alkali and is stirred thoroughly.

A bleached and mercerized cotton fabric is printed with the printing paste thus prepared on a screen printing machine in an optional design and is subsequently dried.

The dyestuff fixation on the cotton fabric is effected as follows:

The printed and dried material is slop-padded on the padder with a solution which contains in 1,000 parts by volume 10 parts by volume of 85% formic acid, 40 parts by volume of monochloroacetic acid and 200 parts of sodium chloride; after an air passage of 120 seconds it is then aftertreated and finished in usual manner by rinsing, soaping at the boil with the optional use of a detergent and dispersing agent, and by subsequent clear-rinsing.

A printing design of a deep turquoise shade is obtained which shows the optimum general fastness properties.

The dyestuff used in the above Example is prepared as follows:

12.6 Parts of sodium hydrogenocarbonate are introduced into a solution of 40 parts of 3,4-diaminobenzonitrile in 175 parts of N-methylpyrrolidone, then the solution is superposed by nitrogen in a closed vessel and is cooled to +5° C. Thereafter 43.6 parts of copper phthalocyanine-3-trisulfochloride in the form of a moist filter cake are slowly introduced, while stirring thoroughly, and the temperature is maintained in the range of from 5° to 10° C.; thereafter the mixture is continued to be stirred for 18 hours at 20° C. The reaction mixture is subsequently introduced into 500 parts of water, the precipitated new compound is filtered off, is washed thoroughly with water and methanol and dried.

EXAMPLES 2 to 33

If for the preparation of the printing paste described in Example 1, one of the dyestuffs specified in the following Table 1 is used instead of the dyestuff used in the above Example, and the process is carried out as has been described in Example 1, printing designs are obtained which also have good general fastness properties and show the color shades indicated in Table 1 on cotton fabric:

TABLE 1

| Ex. | Formula | Color shade |
|---|---|---|
| 2 | CuPc-3—[SO$_2$—NH—C$_6$H$_4$—NH$_2$]$_3$ | turquoise blue |
| 3 | CuPc-3—[SO$_2$—NH—C$_6$H$_4$—NH$_2$]$_{2.5}$ | turquoise blue |
| 4 | CuPc-3—[SO$_2$—NH—C$_6$H$_4$—NH$_2$]$_4$ | turquoise blue |
| 5 | CuPc-(3)(SO$_3$H)—[SO$_2$—NH—C$_6$H$_4$—NH$_2$]$_3$ | turquoise blue |
| 6 | CuPc-(3)(SO$_3$H)—[SO$_2$—NH—C$_6$H$_4$—NH$_2$]$_2$ | turquoise blue |
| 7 | CuPc-4—[SO$_2$—NH—C$_6$H$_4$—NH$_2$]$_4$ | turquoise blue |
| 8 | NiPc-3—[SO$_2$—NH—C$_6$H$_4$—NH$_2$]$_3$ | blue-green |
| 9 | CoPc-3—[SO$_2$—NH—C$_6$H$_4$—NH$_2$]$_3$ | blue-green |
| 10 | CuPc-(3,4',4'',4''')(SO$_3$H)$_{1.5}$—[SO$_2$—NH—C$_6$H$_4$—NH$_2$]$_{2.5}$ | turquoise blue |
| 11 | [CuPc—(C$_6$H$_4$)$_4$]—[SO$_2$—NH—C$_6$H$_4$—NH$_2$]$_4$ | green |
| 12 | CuPc-(3)(SO$_3$H)—[SO$_2$—NH—C$_6$H$_3$(CN)—NH$_2$]$_2$ | turquoise blue |

TABLE 1-continued

| Ex. | Formula | Color shade |
|---|---|---|
| 13 | CuPc-(3) $\left[\text{SO}_2-\text{NH}-\text{C}_6\text{H}_3(\text{CN})(\text{NH}_2)\right]_2$, SO$_2$—NH—C$_6$H$_4$—NH$_2$ | turquoise blue |
| 14 | CoPc-3 $\left[\text{SO}_2-\text{NH}-\text{C}_6\text{H}_3(\text{CN})(\text{NH}_2)\right]_3$ | turquoise blue |
| 15 | CoPc-(3) $\left[\text{SO}_2-\text{NH}-\text{C}_6\text{H}_4-\text{NH}_2\right]_2$, SO$_3$H | turquoise blue |
| 16 | (dipyrenyl dioxazine) $\left[\text{SO}_2-\text{NH}-\text{C}_6\text{H}_4-\text{NH}_2\right]_4$ | blue |
| 17 | triphenodioxazine with two NH—C$_6$H$_5$ and two SO$_2$—NH—C$_6$H$_4$—NH$_2$ groups | blue |
| 18 | di(N-ethylcarbazole) dioxazine $\left[\text{SO}_2-\text{NH}-\text{C}_6\text{H}_4-\text{NH}_2\right]_{3.5}$ | blue |
| 19 | di(N-ethylcarbazole) dioxazine (SO$_3$H)$_2$ $\left[\text{SO}_2-\text{NH}-\text{C}_6\text{H}_4-\text{NH}_2\right]_2$ | blue |
| 20 | hydroxynaphthalene azo with sulfonamide anilines | orange |
| 21 | pyrazolone azo dye with two NHSO$_2$—C$_6$H$_4$—NH$_2$ groups | yellow |

TABLE 1-continued

| Ex. | Formula | Color shade |
|---|---|---|
| 22 | | yellow |
| 23 | | red |
| 24 | | yellow |
| 25 | | orange |
| 26 | | yellow |
| 27 | | blue |
| 28 | | green |
| 29 | | blue |

TABLE 1-continued

| Ex. | Formula | Color shade |
|---|---|---|
| 30 | 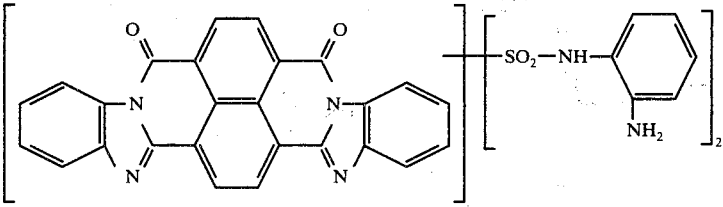 | brown |
| 31 | 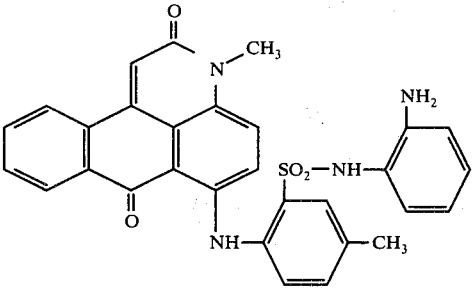 | red |
| 32 | 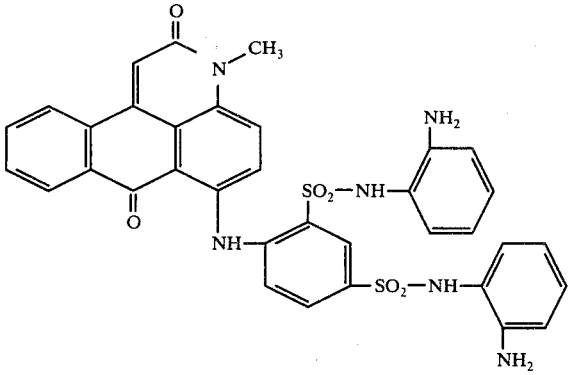 | red |
| 33 | Dyestuff prepared by conversion of C.I. Solvent Black 5 into the sulfochloride by way of chlorosulfonic acid and thionylchloride and subsequent reaction with 1,2-diaminobenzene | black |

EXAMPLE 34

A mixture of 5 g of a dyestuff corresponding to the following constitution

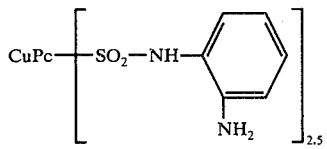

and 50 g of urea is dissolved by adding a solution of 40° C. of 100 ml of water and 5 ml of an aqueous 32.5% sodium hydroxide solution; thereafter 500 g of a printing thickener fast to alkali and consisting of 450 g of a 6% aqueous bean flour, 45 ml of water and 5 ml of an aqueous 32.5% sodium hydroxide solution are added to this solution. While continuing to stir thoroughly, 11 g of the aromatic amine having the Colour Index No. C.I. 37 130 as well as 20 g of a 40% aqueous solution (described subsequently) of a coupling component having the Colour Index No. C.I. 37 613 are added. 30 Grams of an aqueous 33% sodium nitrite solution are added to the paste thus obtained, and the mixture is made up to 1 kg with water and is stirred thoroughly.

The aqueous solution of the coupling component is prepared as follows: 40 Grams of the coupling component C.I. No. 37 613 are premixed with 25 ml of denatured ethanol and then dissolved by pouring a solution of 40° C. of 25 ml of water and 10 ml of an aqueous 32.5% sodium hydroxide solution over the mixture.

A spun rayon fabric which has been pretreated in an alkaline solution, is printed with the above-prepared printing paste on a rotary screen printing machine by way of a cylindrical screen having been engraved in any manner, and is then dried. For developing the dyes, the printed fabric is impregnated on a padder with a cold aqueous solution which contains 100 ml of monochloroacetic acid and 150 g of sodium chloride per liter; following an air passage of 2 minutes, the fabric is passed through an aqueous bath of a temperature of 70° C. which contains 10 g of anhydrous sodium carbonate per liter. Following another passage through hot water the fabric is after-treated and finished in common manner, for example according to the method described in Example 1.

By way of the simultaneous developing of the turguoise-colored phthalocyanine dyestuff and the yellow developing dye resulting from the diazo component C.I. No. 37 130 and the coupling component C.I. No. 37 613, a deep green shade is obtained which has very good general fastness properties.

EXAMPLE 35

According to the method described in Example 1 a printing paste is prepared, however, using instead of the dyestuff indicated therein 10 parts of a copper phthalocyanine dyestuff which in all probability has the following constitution

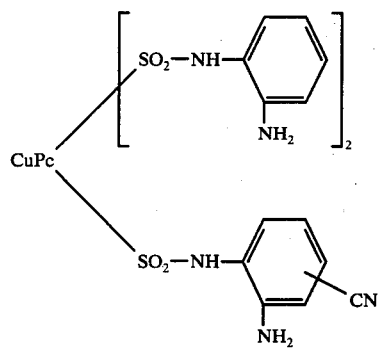

and whose preparation has been described at the end of this Example.

With this printing paste and by means of a screen, an optional design is printed onto a bleached and mercerized calico fabric. After drying of the print the fabric is sprayed with a cold aqueous 30% solution of monochloroacetic acid up to a liquor pick-up of 20% calculated on the fabric, on a spray damping unit placed before the steamer meant for fixation; following an air passage of about 90 seconds it is then treated with superheated steam of a temperature of from 130° to 135° C. for 10 to 20 seconds in the steamer. Subsequently the fabric is rinsed, soaped, rinsed again and dried as usual. A turquoise printing design is obtained which shows excellent general fastness properties.

Preparation of the dyestuff:
5 Parts of sodium bicarbonate are added to a solution of 8.6 parts of 1,2-diaminobenzene and 5.1 parts of 3,4-diaminobenzonitrile in 70 parts of N-methylpyrrolidone, — the solution being superposed by nitrogen — , and the mixture is cooled to 5° C. Thereafter 17 parts of copper phthalocyanine-3-trisulfochloride in the form of a moist filter cake are introduced into the solution while stirring thoroughly, the temperature not exceeding 10° C. The stirring is continued for about 5 hours while cooling with ice, and the temperature of the reaction mixture is then allowed to rise to 20°-25° C. Upon completion of the reaction, the mixture is introduced while stirring into 500 parts of water. The precipitated product is filtered off with solution, is thoroughly washed with water and methanol and dried.

EXAMPLES 36 to 71

If for the preparation of the printing paste of Example 1 one of the phthalocyanine dyestuffs specified in the following Table 2 is used instead of the dyestuff of Example 1 and the prints are produced according to the process described in Example 1 or in Example 35, the resulting prints show very good fastness properties and the color shades on cotton which are indicated in Table 2.

TABLE 2

$$\left[ CuPc - SO_2 - NH - \underset{NH_2}{\overset{R^2}{\bigcirc}} \right]_3$$

| Example | $R^2$ | Color Shade |
|---|---|---|
| 36 | —COOH | turquoise blue |
| 37 | —COOCH$_3$ | turquoise blue |
| 38 | —COOC$_2$H$_5$ | turquoise blue |
| 39 | —CONH$_2$ | turquoise blue |
| 40 | —CONH—NH$_2$ | turquoise blue |
| 41 | —CO—NH—CH$_3$ | turquoise blue |
| 42 | —SO$_2$—CH$_3$ | turquoise blue |
| 43 | —SO$_2$—C$_2$H$_5$ | turquoise blue |
| 44 | —SO$_2$—CH$_2$—CH$_2$—OH | turquoise blue |
| 45 | —SO$_2$—CH$_2$—CH$_2$—Cl | turquoise blue |
| 46 | —SO$_2$—CH$_2$—CH$_2$—OSO$_3$H | turquoise blue |
| 47 | —SO$_2$—CH=CH$_2$ | turquoise blue |
| 48 | —SO$_2$—⟨phenyl⟩ | turquoise blue |
| 49 | —SO$_2$—NH$_2$ | turquoise blue |
| 50 | —SO$_2$—NH—CH$_3$ | turquoise blue |
| 51 | —SO$_2$—N(CH$_3$)$_2$ | turquoise blue |
| 52 | —SO$_2$—N(C$_2$H$_5$)$_2$ | turquoise blue |
| 53 | —SO$_2$—NH—⟨phenyl⟩ | turquoise blue |
| 54 | —SO$_2$—N(CH$_3$)—⟨phenyl⟩ | turquoise blue |
| 55 | —SO$_2$—NH—CH$_2$—CH$_2$—OH | turquoise blue |
| 56 | —SO$_2$—NH—CH$_2$—CH$_2$—OSO$_3$H | turquoise blue |
| 57 | —SO$_2$—N(CH$_2$—CH$_2$—OH)$_2$ | turquoise blue |
| 58 | —SO$_2$—N(CH$_2$—CH$_2$—OSO$_3$H)$_2$ | turquoise blue |
| 59 | —CO—CH$_3$ | turquoise blue |
| 60 | —CO—⟨phenyl⟩ | turquoise blue |
| 61 | —⟨phenyl⟩ | blue-green |
| 62 | —O—CO—CH$_3$ | green |
| 63 | —O—CO—⟨phenyl⟩ | green |
| 64 | —O—⟨phenyl⟩ | green |
| 65 | —CF$_3$ | turquoise blue |
| 66 | —NO$_2$ | blue green |
| 67 | —NH—CO—CH$_3$ | turquoise blue |
| 68 | —NH—CO—⟨phenyl⟩ | turquoise blue |
| 69 | —NH—SO$_2$—CH$_3$ | turquoise blue |
| 70 | —NH—SO$_2$—⟨phenyl-CH$_3$⟩ | turquoise blue |
| 71 | —CN | turquoise blue |

EXAMPLE 72

In a manner analogous to that described in Example 2, a printing paste is prepared while using 5 g of the dyestuff specified in Example 1, 15 g of the aromatic amine having the Colour Index Co. C.I. 37 130 as well as 16 g of a 45% aqueous solution of a coupling component having the Colour Index No 37 505.

The printing paste thus prepared is printed onto a bleached and mercerized cotton popelin by means of a cylinder printing machine. Upon drying of the print, a slightly thickened aqueous 25% solution of lactic acid/glycolic acid in the ratio of 1:1 is overprinted by way of a so-called blotch roller on this cylinder printing machine, and the dyestuffs are developed following an air passage of 120 seconds in an aqueous bath of 25° C.

which contains 15 g of anhydrous sodium carbonate per liter. Subsequently the prints are finished as usual.

The simultaneous development of the turquoise-colored phthalocyanine dyestuff and the red developing dye yields on the fiber a design in a deep bordeaux shade which shows the optimum fastness properties.

EXAMPLE 73

As has been described in Example 1 above, a printing paste ready for use is prepared, while using 10 parts of the dyestuff of the constitution

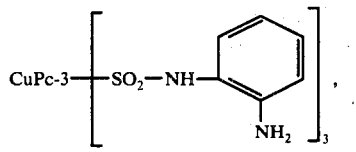

and said paste is then applied by means of a screen onto a batiste of viscose rayon. Following an intermediate drying, the printed fabric is slop-padded on a two-roll padding mangle with an aqueous 20% solution of monochloroacetic acid and is developed continuously after an air passage of 60 seconds in an aqueous bath of 70° C. which contains 12 g of anhydrous sodium carbonate per liter. Thereafter a hot water passage follows, and the print is then finished in common manner by rinsing, soaping, rinsing and drying. In this way, a deep turquoise-colored design having excellent fastness properties is obtained on the fiber.

EXAMPLES 74 TO 87

If instead of the phthalocyanine dyestuff used in Example 73 there is used one of the copper phthalocyanine dyestuffs specified in the following Table 3 which on an average contain three groups of the formula I in the 3-positions of the CuPc-skeleton, and the prints are otherwise produced according to the process described in Example 73, printing designs are obtained which show the color shades on cotton indicated in Table 3 and which have also very good general fastness properties.

TABLE 3

| Ex. | $R^1$ | $R^2$ | $R^3$ | $R^4$ | Color Shade |
|---|---|---|---|---|---|
| 74 | H | H | $CH_3$ | H | turquoise blue |
| 75 | H | $OCH_3$ | $CH_3$ | H | green |
| 76 | H | $CH_3$ | H | $CH_3$ | turquoise blue |
| 77 | H | H | $CH_3$ | $CH_3$ | turquoise blue |
| 78 | H | H | Cl | H | turquoise blue |
| 79 | H | H | $OCH_3$ | H | green |
| 80 | H | H | $OC_2H_5$ | H | green |
| 81 | $CH_3$ | $CH_3$ | H | H | turquoise blue |
| 82 | H | $CH_3$ | $CH_3$ | H | turquoise blue |
| 83 | H | $CH_3$ | H | $CH_3$ | turquoise blue |
| 84 | H | Cl | H | H | turquoise blue |
| 85 | H | Cl | Cl | H | turquoise blue |
| 86 | H | Cl | H | $CH_3$ | turquoise blue |
| 87 | H | —NH—CO—$CH_3$ | H | H | turquoise blue |
| 87a | H | —NH—CO—NH— | | H | green |

EXAMPLE 88

10 Grams of the phthalocyanine dyestuff described in Example 1 are stirred with 100 g of urea and are dissolved by the addition of a solution of 200 ml of water of 40° C. and 20 ml of an aqueous 32.5% sodium hydroxide solution. This dyestuff solution is then introduced, while stirring, into 500 g of an aqueous bean flour thickener consisting of 400 g of an aqueous 6% bean flour ether fast to alkali, 95 ml of water and 5 ml of an aqueous 32.5% sodium hydroxide solution; subsequently 20 g of an aqueous 33% sodium nitrite solution are added, and the mixture is made up to 1 kg with water or with a bean flour ether thickener fast to alkali, while stirring the printing paste thus prepared thoroughly.

A mixed fabric made of a polyester fiber and mercerized cotton (ratio of 67:33) is printed with this printing paste on a screen printing machine in an optional design and is then dried. In order to effect the dyestuff fixation, the printed material is slop-padded on the padder with an aqueous solution containing 10 ml of 85% formic acid, 40 ml of monochloroacetic acid and 20 g of sodium chloride per liter; after an air passage of 120 seconds, it is treated for 5 minutes at 170° C. in superheated steam. Subsequently the prints are after-treated and finished as usual by rinsing, soaping at the boil with the use of a commercial detergent and dispersing agent, and by subsequent clear-rinsing. A tone-in-tone dyeing in a deep turquoise shade is obtained on the mixed fabric which shows good general fastness properties.

EXAMPLE 89

A 100% polyester twill is printed with the printing paste described in Example 88 by means of a screen. After an intermediate drying process the printed fabric is slop-padded on a two-roll padding mangle with an aqueous 20% solution of monochloroacetic acid and is treated — following an air passage of 80 seconds — for 6 minutes with superheated steam of 180° C. in a steamer. Subsequently the print is finished as usual. A deep turquoise-colored design which shows excellent fastness properties is obtained on the fiber.

EXAMPLE 90

3 Parts of the copper phthalocyanine dyestuff described in Example 1 are dissolved in a solution of 2.5 parts by volume of an aqueous 32.5% sodium hydroxide solution, 3 parts of urea and 300 parts by volume of water of 50° C.; this solution is made up to a total of 2000 parts by volume with 1700 parts by volume of water having a temperature of from 60° to 70° C. 100 Parts of a cotton hank are introduced into the dye bath thus prepared, the bath is heated to the boiling point, and the dyeing is continued for 30 minutes at this temperature. Subsequently the excess dye bath is removed by centrifuging or by squeezing off from the yarn, and the dyed hank is treated in an aqueous bath containing 5 g of sodium nitrite and 5 ml of an aqueous 32% hydrochloric acid per liter for 5 minutes at a temperature in the range of from 20° to 30° C. Thereafter the yarn is rinsed, soaped with the simultaneous, optional use of a commercial detergent and dispersing agent, rinsed again and dried. A turquoise-colored dyeing is obtained which shows good fastness properties.

EXAMPLE 91

3 Parts of the dyestuff described in Example 1 are dissolved in 60 parts of N-methylpyrrolidone, 20 parts of water and 10 parts by volume of 1N-hydrochloric acid. 100 Parts of a cotton fabric are introduced into this solution and are dyed for 30 minutes at 95° C. The fabric is then rinsed with cold water for a short time and subsequently treated for 30 seconds in an aqueous 40% sodium nitrite solution of 20° C.; the excess nitrite solution is thereafter removed by squeezing off, and the fabric is introduced into a bath of 1N-hydrochloric acid where it is moved for 1 minute. The material is then finished by rinsing with cold and hot water, by soaping at the boil, optionally while using simultaneously a commercial detergent and dispersing agent, by rinsing again with water and drying. A turquoiseblue dyeing is obtained which shows good fastness properties.

EXAMPLE 92

A cotton fabric is introduced into a solution of 1 part of a dyestuff to which the following constitution may be attributed

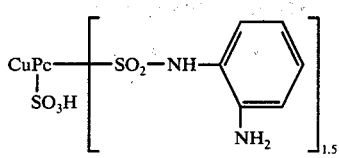

3 parts by volume of an aqueous 1N-sodium hydroxide solution and 20 parts of water, and it is heated in this bath for 30 minutes at 90° C., while stirring constantly. Subsequently the fabric is rinsed for a short time with cold water, is introduced into an aqueous 40% sodium nitrite solution, is left there for 30 seconds, while stirring; then the excess nitrite solution is squeezed off and the fabric is treated for about 1 minute in an aqueous 1N-hydrochloric acid. The cotton fabric thus treated is subsequently rinsed with cold and hot water and is soaped at the boil. A strong turquoise blue dyeing is obtained which shows good fastness properties.

The dyestuff used is prepared as follows:
10.8 Parts of 1,2-diaminobenzene are dissolved in 300 parts of water at 50° C. 16.5 Parts of a copper phthalocyanine-3-sulfochloride containing about 2.5 sulfochloride groups per molecule on an average, are introduced into this solution in the form of a moist filter cake, while stirring thoroughly; subsequently 40 parts by volume of an aqueous saturated sodium carbonate solution are added, while maintaining a constant temperature of 50° C., and the reaction mixture is continued to be stirred for 2 hours at 50° C. Upon completion of the reaction the precipitated product is filtered off, is washed thoroughly with water and dried at 60° C. in the drying cabinet. 18 Parts of a dark blue powder are obtained, the composition of which corresponds to the above formula.

EXAMPLE 93

A printing paste is prepared according to Example 1, however, with the addition of 50 parts of a reactive dyestuff prior to filling up the amount to a total weight of 1000 parts, said dyestuff corresponding — in the form of the free acid — to the formula

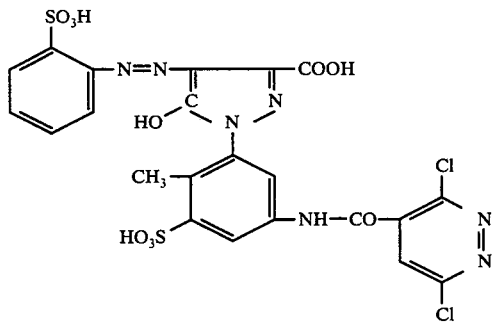

A bleached and mercerized cotton fabric is printed with the printing paste thus prepared and is dried subsequently at about 60° C. The following dyestuff fixation on the cotton fabric is effected according to the method described in Example 1. A clear green print is obtained which shows good general fastness properties.

EXAMPLE 94

10 Parts of the dyestuff mentioned in Example 1 are mixed with 100 parts of urea and are dissolved by adding a solution of 40° C. consisting of 200 parts by volume of water and 20 parts by volume of an aqueous 32.5% sodium hydroxide solution. This solution is stirred into 250 parts of a printing thickener consisting of 80% of a 6% aqueous bean flour ether thickener fast to alkali and 20% of an aqueous sodium hydroxide solution of about 1.6% strength. Subsequently 20 parts of an aqueous 33% sodium nitrite solution as well as a solution of 40 parts of the dyestuff having the Colour Index Number 60 531, in 300 parts of water and 50 parts of diethylene-glycol-mono-n-butylether are added; thereafter the whole is made up to a total of 1000 parts by means of the bean flour ether thickener fast to alkali and is stirred thoroughly.

A bleached and mercerized cotton fabric is printed with the printing paste thus prepared and is dried; the dyestuff fixation is effected on the fabric according to the method described in Example 1. A clear green color shade is obtained which shows good general fastness properties.

EXAMPLE 95

A printing paste is prepared according to Example 94, however, while adding the components indicated below to the printing paste instead of the solution of the dyestuff C.I. No. 60 531:
30 Parts of thiodiethylene-glycol,
50 parts of an aqueous alkaline 40% solution of the coupling component having the C.I. No. 37 530, and
50 parts of the sodium salt of 3-cyano-1-(4'-chloro-2'-methylphenyl)-triazene.

A cotton fabric is printed with this printing paste; the dyestuffs are fixed on the fabric in accordance with the method indicated in Example 1. A deep bordeaux shade is obtained which shows good general fastness properties.

We claim:
1. A process for the fixation of an organic dyestuff on materials having a fibrous structure, which comprises applying an organic dyestuff containing one or several groups of the formula (I)

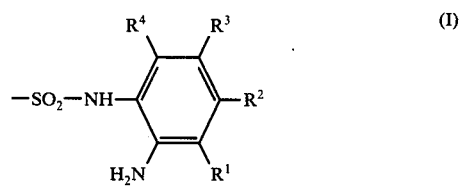

in which $R^1$, $R^2$, $R^3$ and $R^4$ each represent a non-ionic, anionic or cationic substituent, with the exception of a primary or secondary amino group or the salts thereof, in dissolved form onto said materials and subsequently subjecting it to the action of nitrous acid.

2. A process according to claim 1, which comprises applying onto the fibrous material a liquor or printing paste containing an organic dyestuff having the group of the formula (I), a diazotizable aromatic amine of the ice color technique, a coupling component of the ice color technique and an alkali metal nitrite, subjecting it to the action of an acid and subsequently treating it with an acid-binding agent, such as sodium hydroxide, potassium hydroxide, sodium carbonate, potassium carbonate, sodium bicarbonate, sodium acetate, or sodium phosphate, in order to arrive at a slightly acid, neutral or alkaline pH range.

3. A process according to claim 1, which comprises starting from a dye bath, a dye liquor or a printing paste containing besides the organic dyestuff with the group of the formula (I) and the alkali metal nitrite additionally a reactive dyestuff, applying said dye bath, liquor or paste onto the fiber, fixing at first the reactive dyestuff by way of an alkaline medium and fixing subsequently the organic compound with the group of the formula (I) onto the fiber under the action of nitrous acid.

4. A process according to claim 3, which comprises using as fiber-reactive dyestuff a dyestuff containing as reactive group a dichloropyridazine radical.

5. A fiber material, onto which an organic dyestuff containing one or several groups of the formula (I) has been applied and fixed according to a process as claimed in claim 1.

* * * * *